Feb. 11, 1958   S. H. GELBOND   2,823,042
SHOPPING CART GUARD
Filed July 20, 1955   2 Sheets-Sheet 1
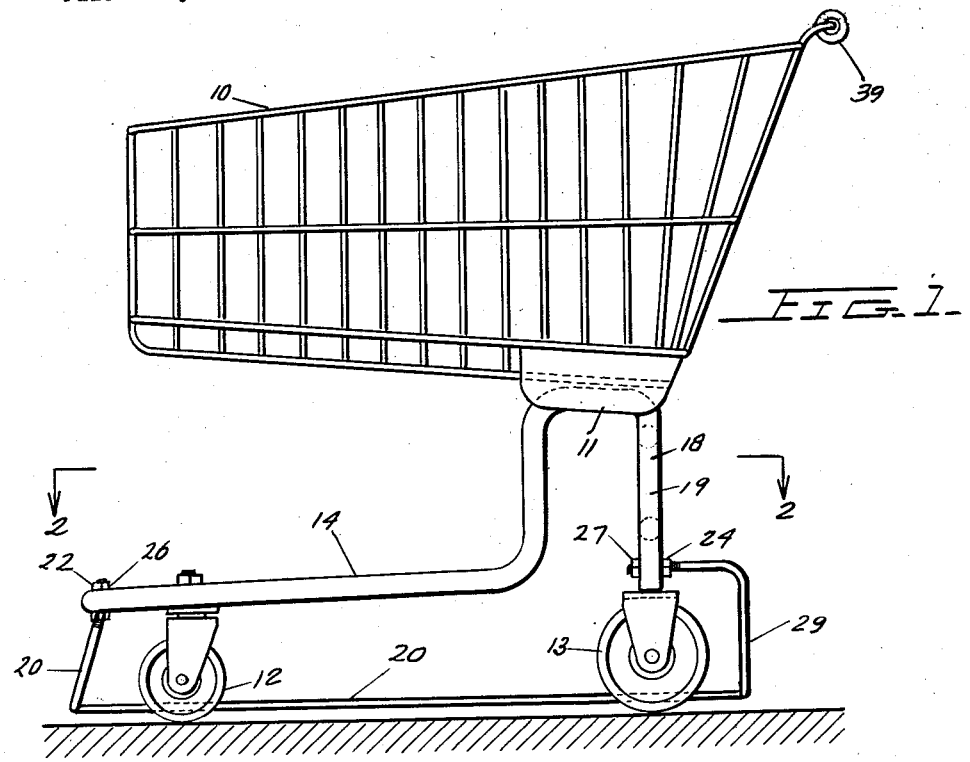
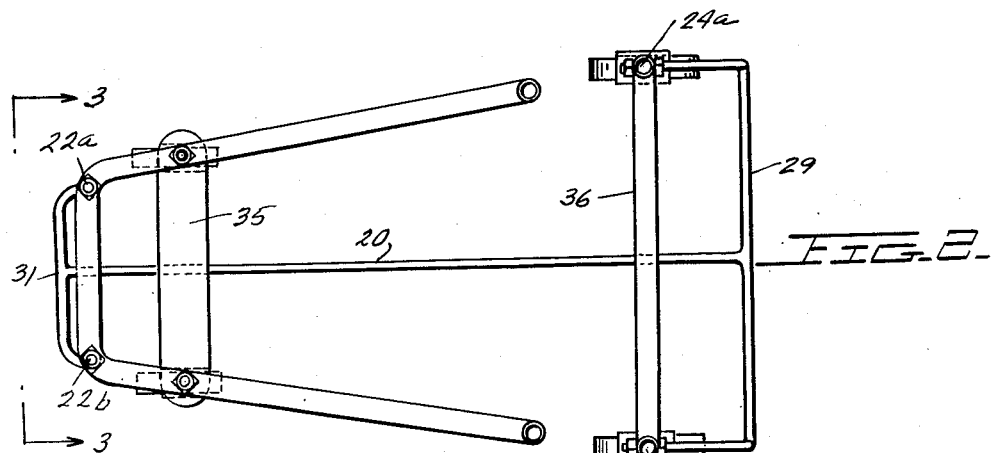
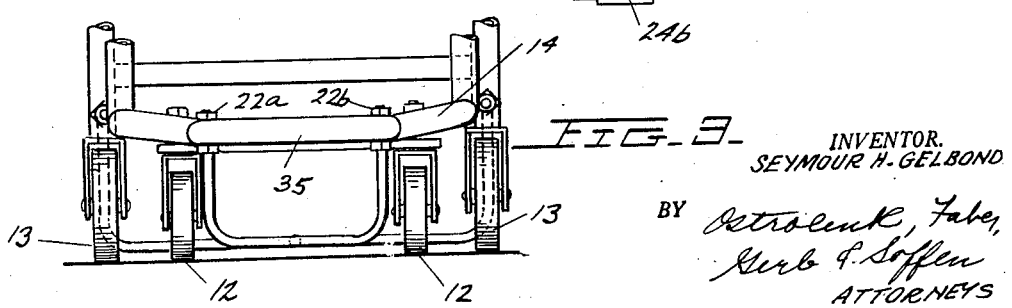
INVENTOR.
SEYMOUR H. GELBOND
BY Ostrolenk, Faber,
Gerb & Soffen
ATTORNEYS Feb. 11, 1958 S. H. GELBOND 2,823,042
SHOPPING CART GUARD
Filed July 20, 1955 2 Sheets-Sheet 2
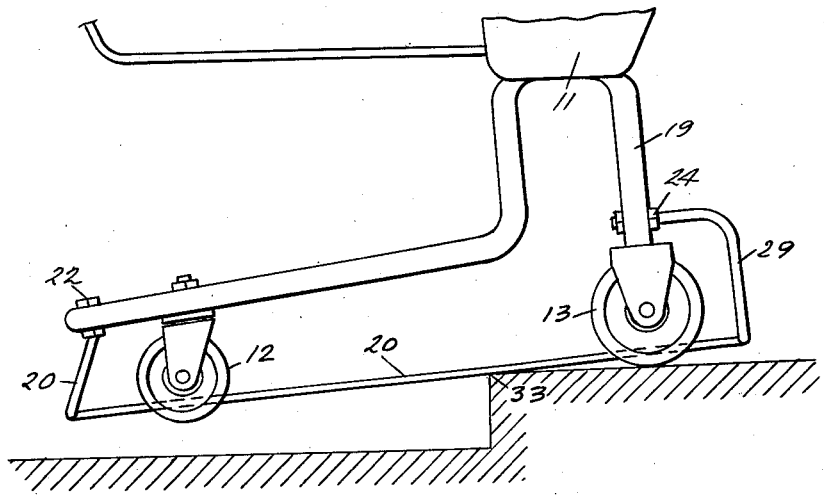
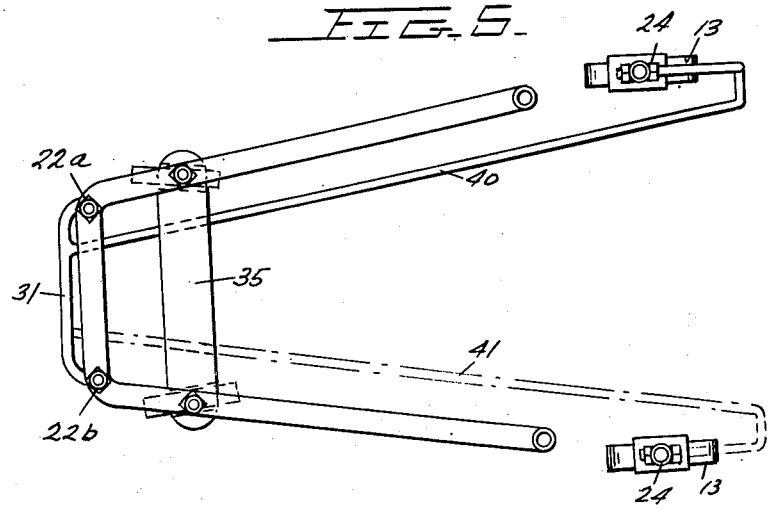
INVENTOR.
SEYMOUR H. GELBOND
BY Ostrolenk, Faber,
Gerb & Soffen
ATTORNEYS

United States Patent Office 2,823,042
Patented Feb. 11, 1958

2,823,042

SHOPPING CART GUARD

Seymour H. Gelbond, Fresh Meadows, N. Y.

Application July 20, 1955, Serial No. 523,197

3 Claims. (Cl. 280—33.99)

My invention relates to a shopping cart having associated therewith a novel type of guard member which enables such carts to be protected from loss, pilferage and other misuse and at the same time will not interfere with their intended utility.

It has been found that a major problem arises in the operation of supermarkets which employ basket carriages or shopping carts of the type which can be readily wheeled by the shopper. Such carts, because of the fact that they have such great utility, are often removed from the store, by shoppers, innocently or otherwise thereby causing the store owner a rather substantial and continuing loss.

I propose to overcome this problem by providing a guard member for a grocery-type shopping cart which will make the same suitable for use only in the grocery store or on a flat sidewalk or parking lot immediately adjacent thereto, and thereby discourage removal from the premises. At the same time my invention will not restrict the utility of such carts when used for their intended purposes.

I propose to accomplish this result by providing a guard member which is secured to the frame of the cart and extends along the bottom thereof in a longitudinal direction and thereby allow a minimum of clearance between the cart and the surface over which it is wheeled. This will make it difficult for anyone to use the cart, except on a relatively flat surface as found in the grocery store or on the premises readily adjacent thereto.

Accordingly it is an object of my invention to provide a shopping cart which will discourage thefts and losses of the same, but which will, at the same time, efficiently perform its intended function.

It is another object of my invention to provide a cart containing an attachment in the form of a longitudinal guard member which will enable the cart to be readily wheeled over a flat surface and used only with difficulty on rough terrain.

It is a further object of my invention to provide a novel attachment for a shopping cart which may take various embodiments and which will be attached to a lower portion of the cart frame, and will, in fact, constitute the lowest portion of said frame so that the utility of this cart with respect to unintended uses is necessarily restricted.

These and other objects of my invention will become more apparent when taken in connection with the drawings and the following description in which:

Figure 1 is a side view of a shopping cart showing how my novel guard member may be attached thereto.

Figure 2 is a view of my novel guard attachment taken along the lines 2—2 of Figure 1.

Figure 3 is a front view of my cart taken along the lines 3—3 of Figure 2.

Figure 4 illustrates how my novel guard member will prevent use of the cart on a rough surface such as a step.

Figure 5 is a view similar to that of Figure 2 showing another embodiment of my invention wherein the guard member is disposed at an angle with the longitudinal axis so as to provide for easier nesting.

Essentially my invention involves a typical shopping cart including a wheel frame and a basket supported by the frame in which there is secured to the said frame a guard member which extends in a longitudinal direction along the frame and projects behind the axis of rotation of a rear wheel thereof. Preferably the guard member should also extend to a point in front of the axis of rotation of a front wheel of the cart.

The guard member is such that it acts as the lowermost portion of the frame and leaves a minimum of clearance between the frame and the ground. This clearance does not obstruct the movement of the cart on a flat surface but will obstruct such movement on any rough surface having projections and/or depressions therein substantially greater than the distance between the ground and the guard member.

Referring now to the drawings there is illustrated therein a typical type of shopping cart although it should be understood that my novel guard attachment may be used in connection with any of the shopping carts of the same general type shown in the drawings. The type of shopping cart to which I refer includes a basket 10 supported on a wheeled frame 11 carrying front wheels 12 and rear wheels 13 interconnected by members 35 and 36 respectively.

One portion of the frame 14 extends forwardly at least as far as it is necessary to support the front wheels. Another piece 19 of the frame member 18 is attached to support the rear wheels. Often this type of cart is so designed so that the width thereof is narrower at the front end than at the rear thereby allowing for easier nesting. Such a cart is exemplified by United States Patent No. 2,596,775. It is, however, the essence of applicant's invention to provide an attachment for this or any other type of shopping cart which includes a wheeled frame supporting a shopping basket.

One embodiment of applicant's guard member is readily seen from an inspection of Figures 1 to 4. It can be seen that the guard attachment constitutes a longitudinally extending bar 20 which is secured to a front portion of the frame thereof at 22 and to the rear portion at 24. This can be done by having the ends of the guard member threaded and securing the same to the frame by means of nuts 26 and 27 or alternatively by any other suitable means. The specific guard member illustrated herein is attached to the rear portion of the frame at two points 24a and 24b and the front portion at 22a and 22b.

The attachment is made well above the wheels of the cart and the guard extends rearwardly to a point well behind the axis of rotation of the rear wheels to a point defined by bar member 29. A front bar member 31 situated in front of the axis of rotation of the front wheels is also desirable, it too being connected by longitudinal member 20.

It is most essential that the guard member extend behind the axis of rotation of a rear wheel since this will prevent the user thereof from readily lifting the same over curves or rough terrain. The difficulty with such an operation is readily apparent from an inspection of Figure 4 wherein the longitudinal guard member 20, upon going over a step immediately is contacted by the point 33 of such a step. Preferably the longitudinal member extends forwardly to a point in front of the axis of rotation of a front wheel. However, even if it did not so extend it would be difficult to maneuver the cart through rough terrain so long as it is being handled in the usual fashion, i. e. by means of the user gripping it through handle bar 39.

Figure 5 shows another embodiment of my guard member in which the longitudinal member is disposed at an angle from the longitudinal axis such that it approaches the center of the cart at the front thereof. The guard member here may consist either solely of bar 40 or of bars 40 and 41, the latter being shown by the dotted lines. Although I have illustrated a preferred embodiment wherein the guard member is angularly displaced from the vertical longitudinal axis of the cart, such displacement may also be with respect to the horizontal. As hereinabove stated, the primary requirements are that the guard extend sufficiently in back of the rear wheels and sufficiently close to the ground. The reason for the angular displacement is to provide for easier nesting of the carts should it be desired to employ a nesting type cart in connection with my invention.

It should be noted that the guard member which I propose will normally ride so close to the ground that at least a portion thereof is below the axis of rotation of either the front or rear wheels. The clearance of the guard will be of the order of about one-eighth to one-half inch, so that sufficient clearance is provided for use in the grocery store or parking lot but does not have sufficient utility to encourage use of the same outside of this area.

In the foregoing, I have described my invention only in connection with preferred embodiments thereof. Many variations and modifications of the principles of my invention within the scope of the description herein are obvious. Accordingly, I prefer to be bound not by the specific disclosure herein, but only by the appending claims.

I claim:

1. A shopping cart of the nesting type including a wheeled frame and a basket supported by said frame, a guard member secured to the said frame and having a portion thereof extending forwardly between the wheels of the cart from a point behind and below the axis of rotation of a rear wheel thereof to a point forward of and below the axis of rotation of a front wheel thereof; said guard member being non-parallel with respect to a longitudinal line taken through said shopping cart in the normal direction of travel of said shopping cart.

2. A shopping cart including a wheeled frame the rear wheels of said cart being spread further apart than the front wheels, a basket supported by said frame, and below said frame a guard member extending forwardly between the wheels of the cart from a point behind the axis of rotation of a rear wheel thereof to a point forward of the axis of rotation of a front wheel thereof said guard member being substantially parallel with respect to a line joining a front and rear wheel of said shopping cart on one side thereof.

3. In a shopping cart of the nesting type comprising a wheeled frame and a basket supported by said frame, the improvement which comprises a guard member secured to a rear and front portion of the wheeled frame and extending longitudinally between the wheels of the cart from a point behind and below the axis of rotation of a rear wheel to a point forward of and below the axis of rotation of a front wheel thereof; said guard member being non-parallel with respect to a longitudinal line taken through said shopping cart in the normal direction of travel of said shopping cart.

References Cited in the file of this patent
UNITED STATES PATENTS

| | | |
|---|---|---|
| 1,182,797 | Roosevelt | May 9, 1916 |
| 1,314,173 | Waller | Aug. 26, 1919 |
| 1,571,880 | Young | Feb. 2, 1926 |
| 1,890,755 | Sheperd | Dec. 13, 1932 |
| 2,556,532 | Goldman | June 12, 1951 |
| 2,662,775 | Goldman | Dec. 15, 1953 |